United States Patent
Shiraki

(10) Patent No.: US 11,316,396 B2
(45) Date of Patent: Apr. 26, 2022

(54) COIL BODY

(71) Applicant: CORELESS MOTOR CO., LTD., Yamato (JP)

(72) Inventor: Manabu Shiraki, Yamato (JP)

(73) Assignee: CORELESS MOTOR CO., LTD., Kanagawa (JP)

( * ) Notice: Subject to any disclaimer, the term of this patent is extended or adjusted under 35 U.S.C. 154(b) by 52 days.

(21) Appl. No.: 16/713,135

(22) Filed: Dec. 13, 2019

(65) Prior Publication Data

US 2020/0195078 A1 Jun. 18, 2020

(30) Foreign Application Priority Data

Dec. 14, 2018 (JP) .............................. JP2018-234093

(51) Int. Cl.
*H02K 3/47* (2006.01)

(52) U.S. Cl.
CPC ...................... *H02K 3/47* (2013.01)

(58) Field of Classification Search
None
See application file for complete search history.

(56) References Cited

U.S. PATENT DOCUMENTS

| | | | | |
|---|---|---|---|---|
| 4,952,011 | A | * | 8/1990 | Ishii ..................... G03B 27/526 355/61 |
| 6,111,329 | A | * | 8/2000 | Graham .................. H02K 3/26 29/598 |
| 2002/0069508 | A1 | | 6/2002 | Graham et al. |
| 2006/0091732 | A1 | * | 5/2006 | Onishi ................... H02K 41/03 310/12.23 |

FOREIGN PATENT DOCUMENTS

| | | |
|---|---|---|
| JP | 3704044 B2 | 10/2005 |
| JP | 2017070140 A * | 4/2017 |
| JP | 2017070140 A | 4/2017 |

OTHER PUBLICATIONS

JPO machine translation of JP-2017070140-A (Year: 2017).*

* cited by examiner

*Primary Examiner* — Naishadh N Desai
(74) *Attorney, Agent, or Firm* — Buchanan Ingersoll & Rooney PC

(57) ABSTRACT

One U-phase coil portion and the next U-phase coil portion in a circumferential direction, one V-phase coil portion and the next V-phase coil portion in the circumferential direction, and one W-phase coil portion and the next W-phase coil portion in the circumferential direction are electrically connected by conductive junctions, respectively.

2 Claims, 9 Drawing Sheets

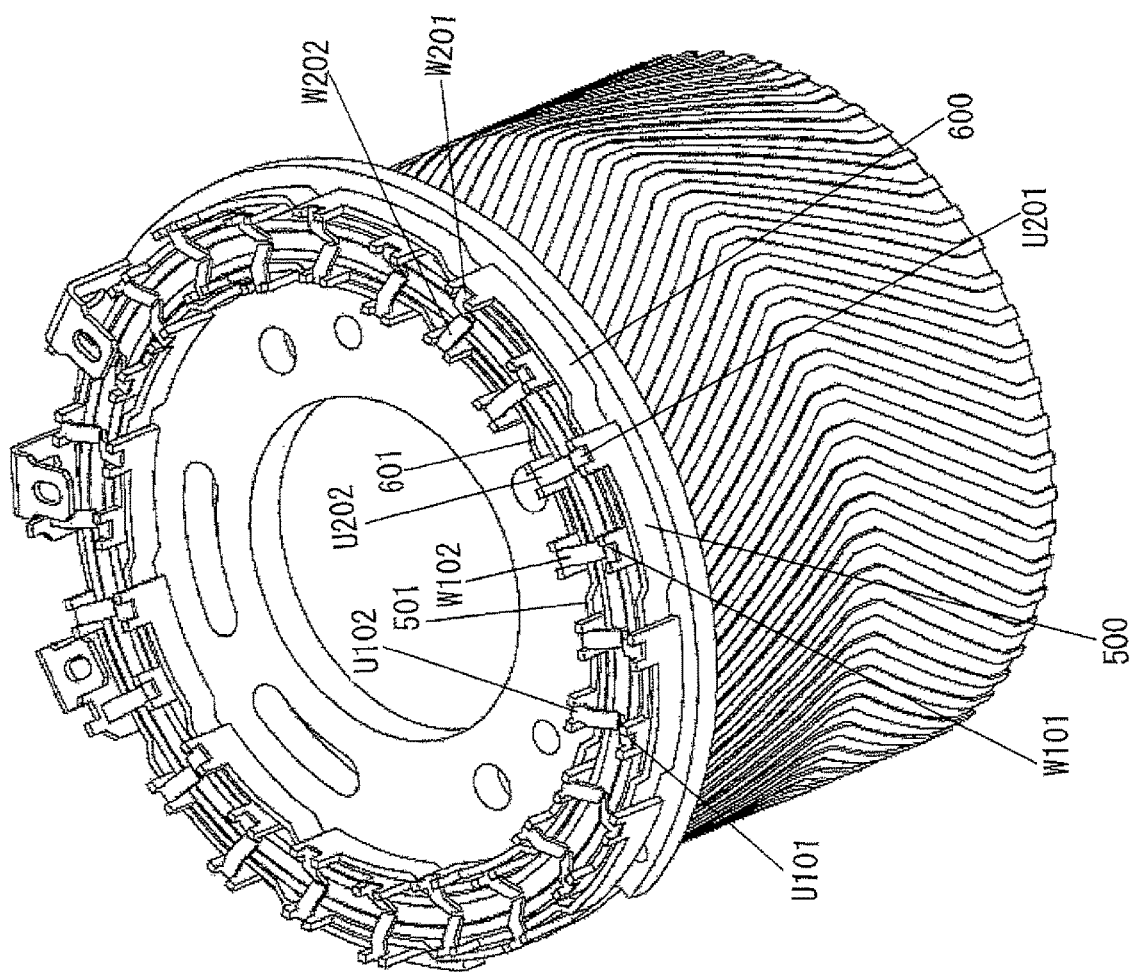

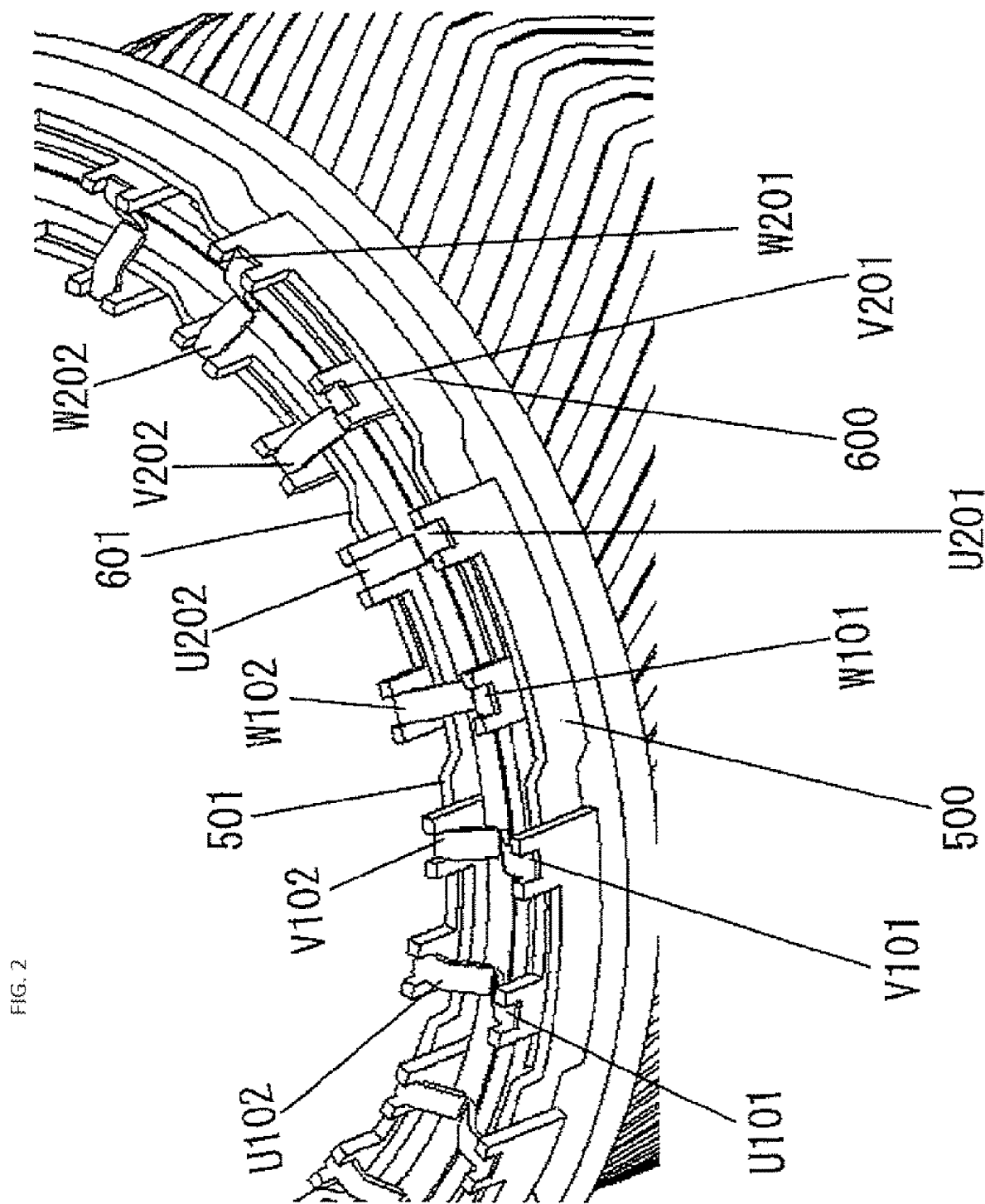

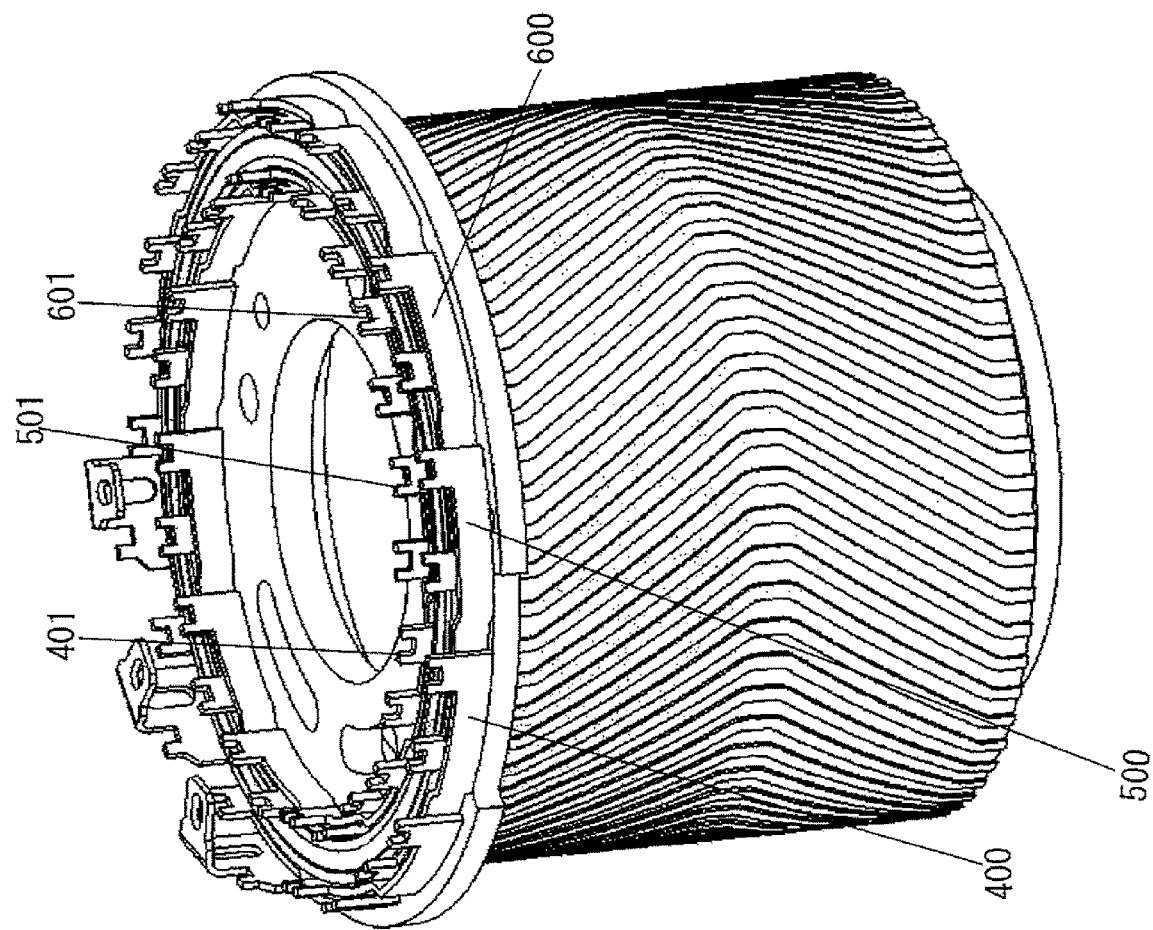

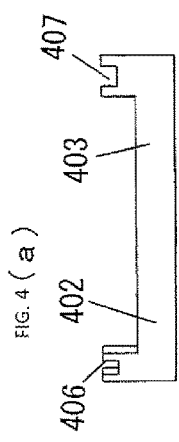
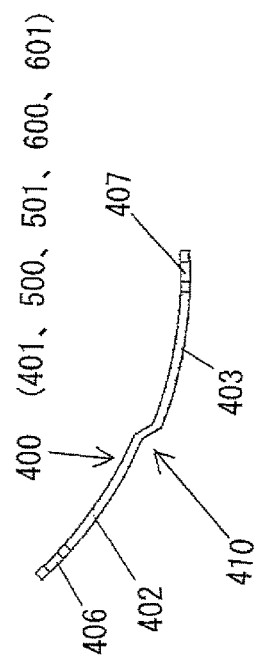
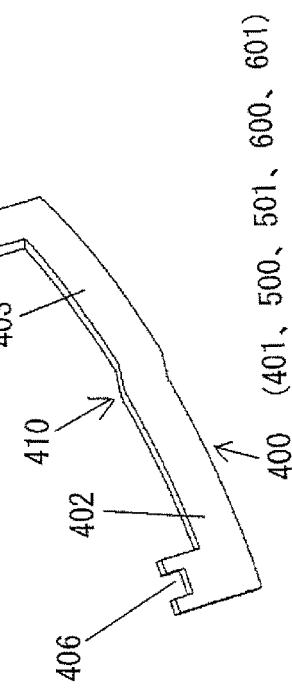

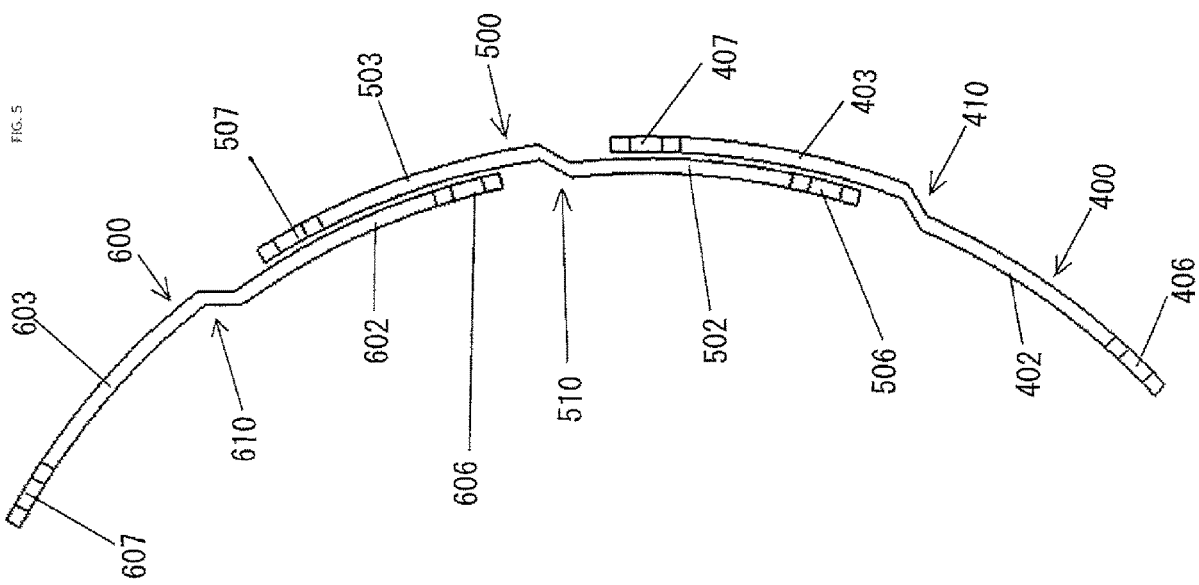

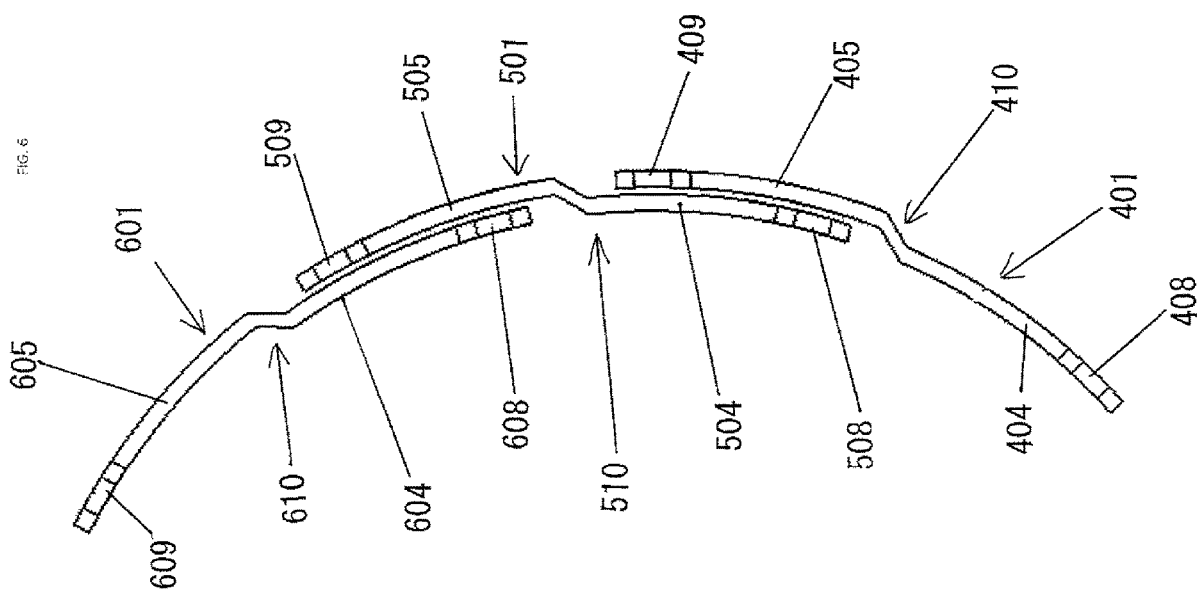

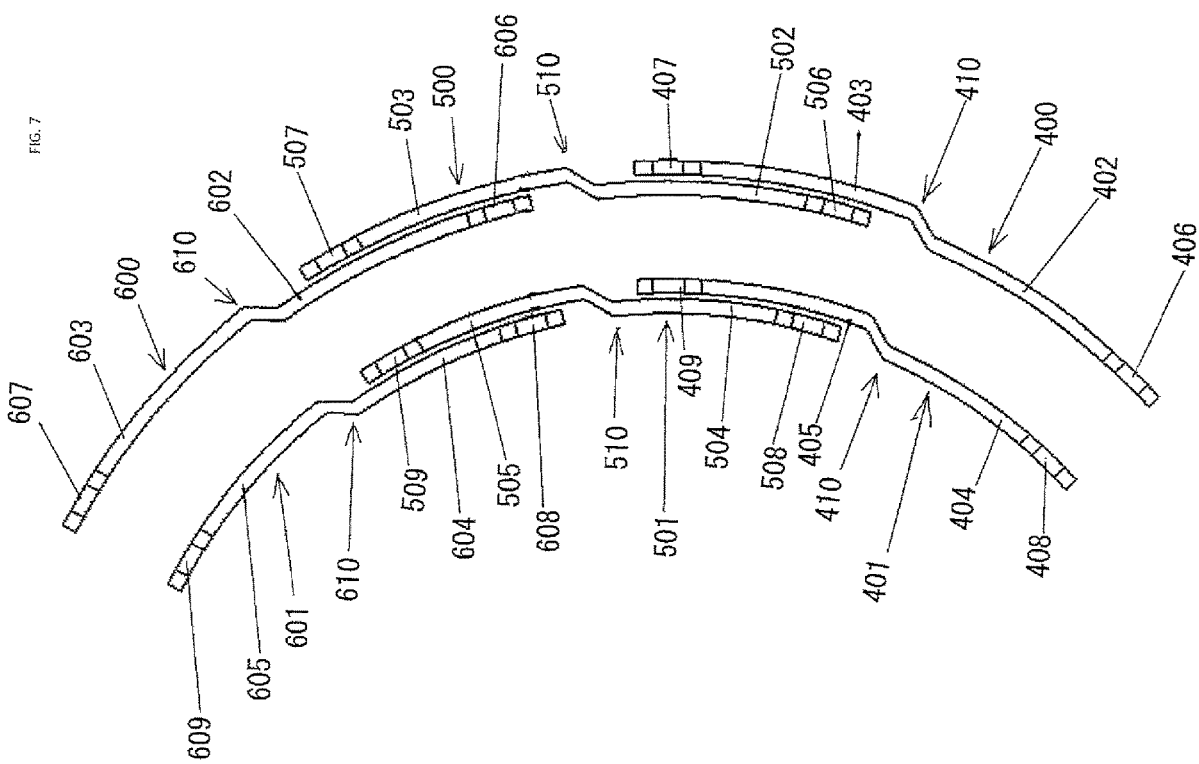

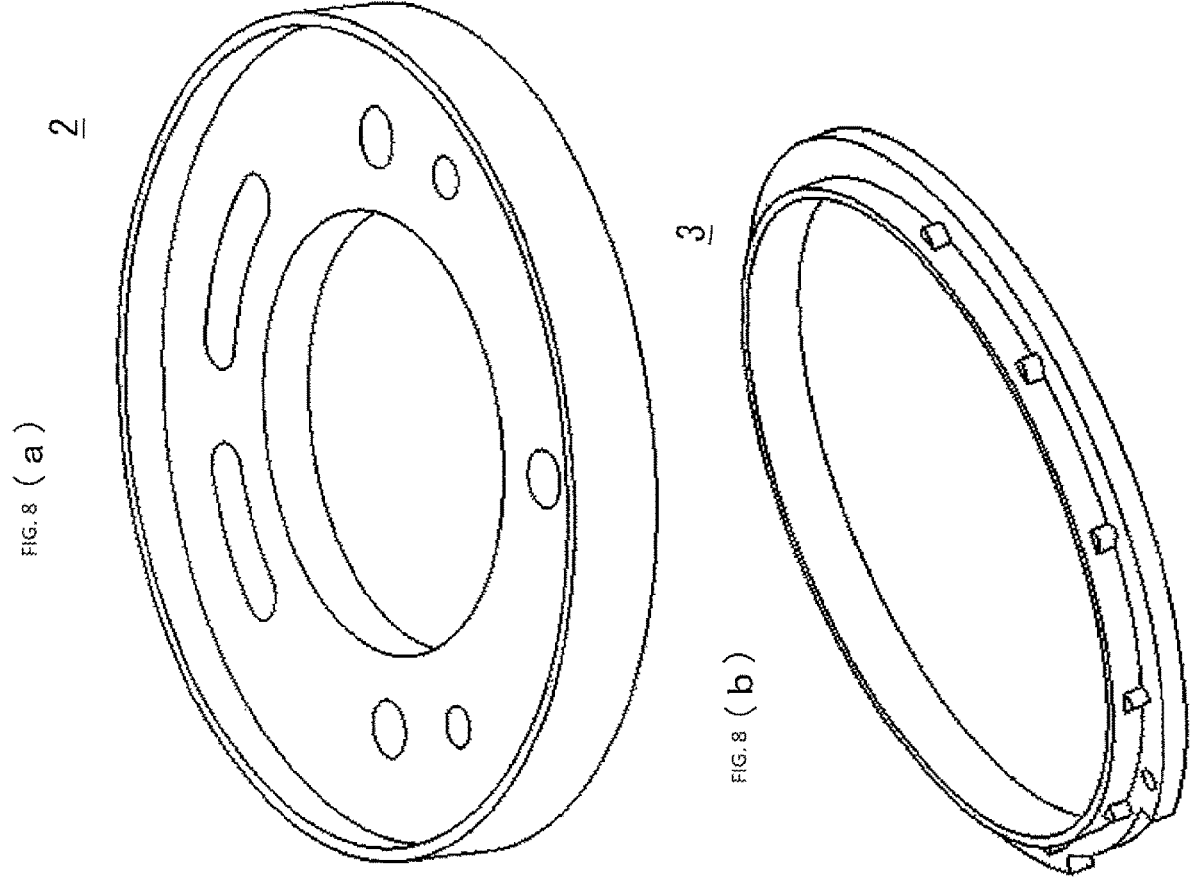

COIL BODY

CROSS-REFERENCE TO RELATED APPLICATION

This application claims priority to Japanese Patent Application No. 2018-234093 filed Dec. 14, 2018, the disclosure of which is hereby incorporated in its entirety by reference.

Field of the Invention

The present invention relates to a coil body used in a coreless rotating electrical machine.

Background of the Invention

In the technical field of rotating electrical machines, coreless rotating electrical machines have been known. In the related art, various proposals have been made as a coil body used in a coreless rotating electrical machine.

For example, JP 3704044 B2 has proposed a coil body formed in a manner that two thin metal plates each having a conductive band pattern formed by etching a conductive plate (for example, a copper plate) are used as cylindrical bodies, and the two cylindrical bodies are concentrically disposed as an inner cylindrical body and an outer cylindrical body. The cylindrical bodies have conductive bands of complementary patterns that constitute an electric circuit by the end portions being connected to each other. A layer of non-conductive fiber stranded wire is formed between the cylindrical bodies, and the conductive band of the inner cylindrical body and the conductive band of the outer cylindrical body are insulated by this layer. The coil body is encapsulated with a material that fills the conductive band portion and the non-conductive fiber stranded wire, specifically, polyimide.

JP 2017-70140 A has proposed a coil body formed by bending a conductive sheet having a plurality of conductive bands and forming the bent conductive sheet into a cylindrical shape.

SUMMARY

An object of the invention is to propose a coil body which is space-saving and miniaturized and causes a large current to pass, the coil body being for a coreless rotating electrical machine having a cylindrical shape in which a plurality of sets each having a U-phase coil portion constituting a U-phase, a V-phase coil portion constituting a V-phase, and a W-phase coil portion constituting a W-phase are sequentially arranged in a circumferential direction to form an annular cylindrical body in plan view.

A cylindrical coil body for a coreless rotating electrical machine having a cylindrical shape in which a plurality of sets each having a U-phase coil portion constituting a U-phase, a V-phase coil portion constituting a V-phase, and a W-phase coil portion constituting a W-phase are sequentially arranged in a circumferential direction to form an annular cylindrical body in plan view, wherein one of the U-phase coil portions and the next U-phase coil portion in the circumferential direction, one of the V-phase coil portions and the next V-phase coil portion in the circumferential direction, and one of the W-phase coil portions and the next W-phase coil portion in the circumferential direction are electrically connected by conductive junctions, respectively.

The cylindrical coil body according to [1], wherein the junction is disposed on a circumferential surface of the cylindrical coil body, and extends in the circumferential direction to form an arc shape in plan view, in the junction, a small-diameter arc portion having a small radius of curvature and a large-diameter arc portion having a large radius of curvature are continuous to each other via a step portion which is formed in an intermediate portion in the circumferential direction and has a stair shape in plan view, in the junction, a radially inner surface and a radially outer surface have electrical insulation, and in the junction, concave portions where electrical connection is performed by a terminal portion of the U-phase coil portion, a terminal portion of the V-phase coil portion, or a terminal portion of the W-phase coil portion being bent to be inserted to the concave portion are provided on an upper side of both ends extending in the arc shape when being disposed on the circumferential surface of the cylindrical coil body.

According to the invention, it is possible to provide a coil body which is space-saving and miniaturized and causes a large current to pass, the coil body being for a coreless rotating electrical machine having a cylindrical shape in which a plurality of sets each having a U-phase coil portion constituting a U-phase, a V-phase coil portion constituting a V-phase, and a W-phase coil portion constituting a W-phase are sequentially arranged in a circumferential direction to form an annular cylindrical body in plan view.

BRIEF DESCRIPTION OF DRAWINGS

FIG. 1 is a perspective view showing a coil body of the invention with a part thereof omitted;

FIG. 2 is a perspective view showing a part of the coil body of FIG. 1 in an enlarged manner with a part thereof omitted;

FIG. 3 is a perspective view showing an example of an arrangement form of a plurality of junctions arranged continuously in a circumferential direction with terminal portions on an upper end side of a U-phase coil portion, a V-phase coil portion, and a W-phase coil portion in the coil body shown in FIG. 1 omitted;

FIGS. 4A to 4C are views showing an example of the junction used in the coil body of the invention, in which FIG. 4A is a side view, FIG. 4B is a plan view, and FIG. 4C is a perspective view;

FIG. 5 is a plan view showing a state in which the plurality of junctions shown in FIGS. 4A to 4C are used for electrical connection between the terminal portions on the radially outer upper end side of the U-phase coil portion, the V-phase coil portion, and the W-phase coil portion;

FIG. 6 is a plan view showing a state in which the plurality of junctions shown in FIGS. 4A to 4C are used for electrical connection between the terminal portions on the radially inner upper end side of the U-phase coil portion, the V-phase coil portion, and the W-phase coil portion;

FIG. 7 is a plan view showing a state in which the plurality of junctions shown in FIGS. 4A to 4C are used for electrical connection between the terminal portions on the radially inner upper end side and electrical connection between the terminal portions on the radially outer upper end side of the U-phase coil portion, the V-phase coil portion, and the W-phase coil portion;

FIGS. 8A and 8B show an example of a junction support portion used in the coil body of the invention, in which FIG. 8A is a perspective view of an inner support portion, and FIG. 8B is a perspective view of an outer support portion.

DETAILED DESCRIPTION

Figure 9:
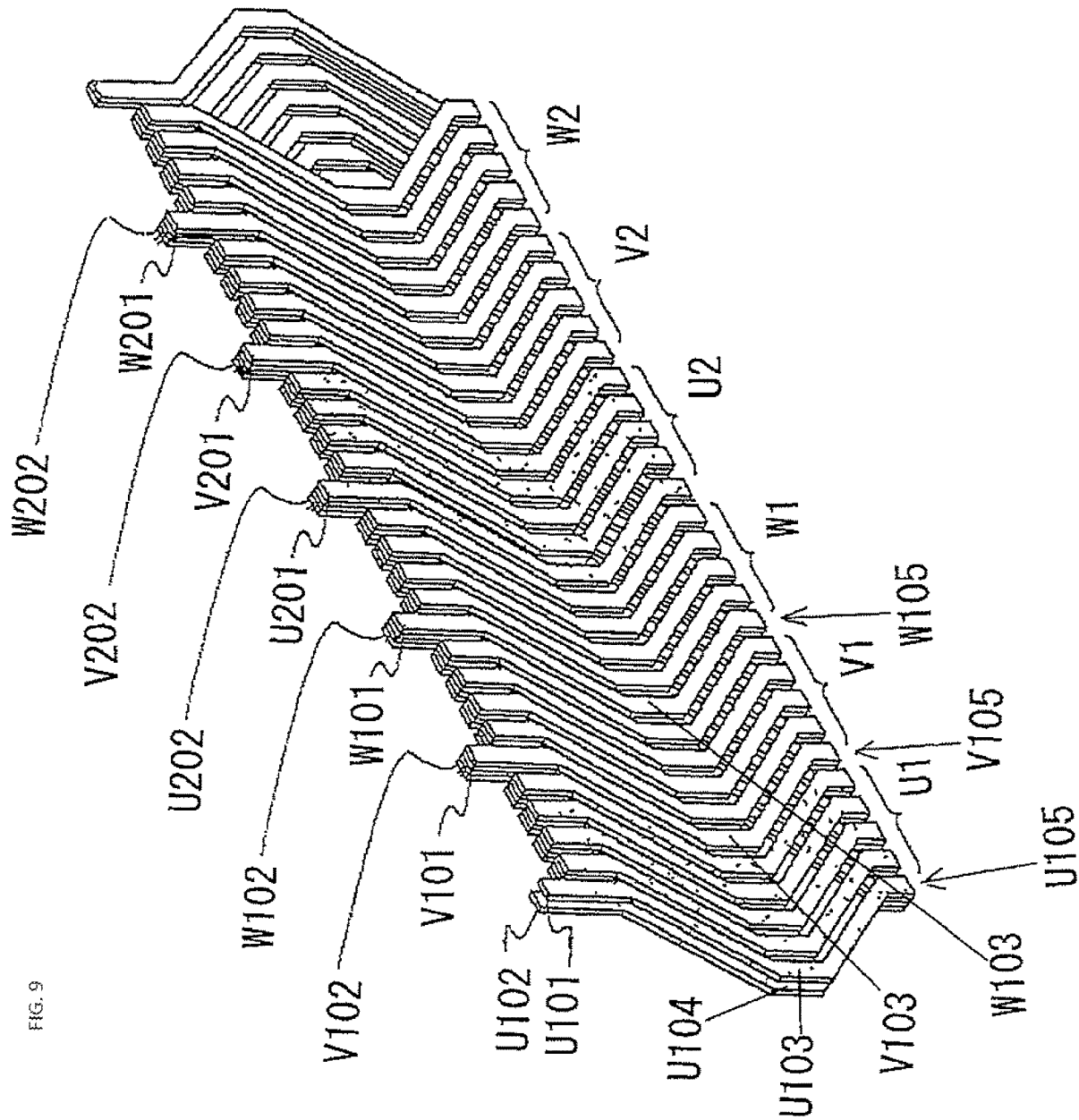
FIG. 9 is a view showing an example of a sequential arrangement form in the circumferential direction in a development state with a part thereof omitted, in the coil body of the present invention for a coreless rotating electrical machine having a cylindrical shape in which a plurality of sets each having the U-phase coil portion constituting the U-phase, the V-phase coil portion constituting the V-phase, and the W-phase coil portion constituting the W-phase are sequentially arranged in the circumferential direction so as to form an annular cylindrical body in plan view.

A coil body of this embodiment is a coil body for a coreless rotating electrical machine having a cylindrical shape in which a plurality of sets each having a U-phase coil portion constituting the U-phase, a V-phase coil portion constituting the V-phase, and a W-phase coil portion constituting the W-phase are sequentially arranged in a circumferential direction so as to form an annular cylindrical body in plan view.

The U-phase coil portion constituting the U-phase includes a U-phase outer coil portion and a U-phase inner coil portion. The U-phase outer coil portion extends in a form including a portion extending from a U-phase outer terminal portion on the upper end side of the cylindrical shape toward a lower end of the cylindrical shape in an axial direction of the cylindrical shape. The U-phase inner coil portion is positioned inward of the U-phase outer coil portion in the radial direction in the cylindrical shape, extends in a form including a portion of which the lower end side is electrically connected to the lower end side of the U-phase outer coil portion and which extends toward the upper end of the cylindrical shape in the axial direction of the cylindrical shape, and terminates at a U-phase inner terminal portion positioned inward of the U-phase outer terminal portion in the radial direction on the upper end side of the cylindrical body. The U-phase coil portion is a coil body having a structure in which the U-phase outer coil portion and the U-phase inner coil portion in the radial direction of the cylindrical shape are insulated from each other and having a plurality of windings per phase.

The V-phase coil portion constituting the V-phase includes a V-phase outer coil portion and a V-phase inner coil portion. The V-phase outer coil portion extends in a form including a portion extending from a V-phase outer terminal portion on the upper end side of the cylindrical shape toward a lower end of the cylindrical shape in an axial direction of the cylindrical shape. The V-phase inner coil portion is positioned inward of the V-phase outer coil portion in the radial direction in the cylindrical shape, extends in a form including a portion of which the lower end side is electrically connected to the lower end side of the V-phase outer coil portion and which extends toward the upper end of the cylindrical shape in the axial direction of the cylindrical shape, and terminates at a V-phase inner terminal portion positioned inward of the V-phase outer terminal portion in the radial direction on the upper end side of the cylindrical body. The V-phase coil portion is a coil body having a structure in which the V-phase outer coil portion and the V-phase inner coil portion in the radial direction of the cylindrical shape are insulated from each other and having a plurality of windings per phase.

The W-phase coil portion constituting the W-phase includes a W-phase outer coil portion and a W-phase inner coil portion. The W-phase outer coil portion extends in a form including a portion extending from a W-phase outer terminal portion on the upper end side of the cylindrical shape toward a lower end of the cylindrical shape in an axial direction of the cylindrical shape. The W-phase inner coil portion is positioned inward of the W-phase outer coil portion in the radial direction in the cylindrical shape, has a lower end side electrically connected to the lower end side of the W-phase outer coil portion, extends in a form including a portion extending toward the upper end of the cylindrical shape in the axial direction of the cylindrical shape, and terminates at a W-phase inner terminal portion positioned inward of the W-phase outer terminal portion in the radial direction on the upper end side of the cylindrical body. The W-phase coil portion is a coil body having a structure in which the W-phase outer coil portion and the W-phase inner coil portion in the radial direction of the cylindrical shape are insulated from each other and having a plurality of windings per phase.

The U-phase inner terminal portion on the upper end side of one U-phase coil portion and the U-phase inner terminal portion on the upper end side of the next U-phase coil portion in the circumferential direction are electrically connected to each other by a conductive inner junction.

The V-phase inner terminal portion on the upper end side of one V-phase coil portion and the V-phase inner terminal portion on the upper end side of the next V-phase coil portion in the circumferential direction are electrically connected to each other by a conductive inner junction.

The W-phase inner terminal portion on the upper end side of one W-phase coil portion and the W-phase inner terminal portion on the upper end side of the next W-phase coil portion in the circumferential direction are electrically connected to each other by a conductive inner junction.

The U-phase outer terminal portion on the upper end side of one U-phase coil portion and the U-phase outer terminal portion on the upper end side of the next U-phase coil portion in the circumferential direction are electrically connected to each other by a conductive outer junction.

The V-phase outer terminal portion on the upper end side of one V-phase coil portion and the V-phase outer terminal portion on the upper end side of the next V-phase coil portion in the circumferential direction are electrically connected to each other by a conductive outer junction.

The W-phase outer terminal portion on the upper end side of one W-phase coil portion and the W-phase outer terminal portion on the upper end side of the next W-phase coil portion in the circumferential direction are electrically connected to each other by a conductive outer junction.

With the above configuration, the one U-phase coil portion and the next U-phase coil portion in the circumferential direction, the one V-phase coil portion and the next V-phase coil portion in the circumferential direction, and the one W-phase coil portion and the next W-phase coil portion in the circumferential direction are electrically connected by conductive junctions, respectively.

In the above, the inner junction is arranged on the inner circumferential side of the cylindrical coil body and extends in the circumferential direction to form an arc shape in plan view. In the inner junction, a small-diameter arc portion having a small radius of curvature and a large-diameter arc portion having a large radius of curvature are continuous to each other via a step portion which is formed in an intermediate portion in the circumferential direction and has a stair shape in plan view. The radially inner surface and the radially outer surface have electrical insulation. Concave portions are provided on the upper side of both ends extending in the arc shape when being disposed on the inner circumferential side of the cylindrical coil body. In the concave portion, electrical connection is performed by the U-phase inner terminal portion on the upper end side, the V-phase inner terminal portion on the upper end side, or the W-phase inner terminal portion on the upper end side being bent to be inserted thereto.

Moreover, in the above, the outer junction is arranged on the outer circumferential side of the cylindrical coil body and extends in the circumferential direction to form an arc shape in plan view. In the outer junction, a small-diameter arc portion having a small radius of curvature and a large-diameter arc portion having a large radius of curvature are continuous to each other via a step portion which is formed in an intermediate portion in the circumferential direction and has a stair shape in plan view. The radially inner surface and the radially outer surface have electrical insulation. Concave portions are provided on the upper side of both ends extending in the arc shape when being disposed on the outer circumferential side of the cylindrical coil body. In the concave portion, electrical connection is performed by the U-phase outer terminal portion on the upper end side, the V-phase outer terminal portion on the upper end side, or the W-phase outer terminal portion on the upper end side being bent to be inserted thereto.

EXAMPLE

A coil body 1 of this example is a coil body for a coreless rotating electrical machine having a cylindrical shape in which a plurality of sets each having a U-phase coil portion constituting the U-phase, a V-phase coil portion constituting the V-phase, and a W-phase coil portion constituting the W-phase are sequentially arranged in a circumferential direction so as to form an annular cylindrical body in plan view.

An example of the structure of a U-phase coil portion U1, a V-phase coil portion V1, and a W-phase coil portion W1 of the coil body 1 used in such a three-phase rotating electrical machine will be described with reference to FIG. 9.

The U-phase coil portion U1 (FIG. 9) is a coil body having a structure in which the U-phase outer coil portion and the U-phase inner coil portion in the radial direction of the cylindrical shape are insulated from each other and having a plurality of windings per phase. In FIG. 9, the front side of the drawing is the U-phase outer coil portion, and the rear side of the drawing is the U-phase inner coil portion.

The U-phase coil portion U1 is formed such that the U-phase outer coil portion of the cylindrical shape and the U-phase inner coil portion of the cylindrical shape, which are electrically connected to each other at a lower end side U105, are insulated from each other in the radial direction.

Specifically, the U-phase outer coil portion of the U-phase coil portion U1 extends in a form including a portion U103 extending from a U-phase outer terminal portion U101 on the upper end side of the cylindrical shape toward a lower end of the cylindrical shape in the axial direction of the cylindrical shape. The U-phase inner coil portion of the U-phase coil portion U1 is positioned inward of the U-phase outer coil portion in the radial direction, has a lower end side electrically connected to the lower end side of the U-phase outer coil portion, extends in a form including a portion U104 extending toward the upper end of the cylindrical shape in the axial direction of the cylindrical shape, and terminates at a U-phase inner terminal portion U102 positioned inward of the U-phase outer terminal portion U101 in the radial direction on the upper end side of the cylindrical body.

In the U-phase coil portion U1, the U-phase inner terminal portion U102 is electrically connected to a U-phase inner terminal portion U202 of the next U-phase coil portion U2 in the circumferential direction of FIG. 1. Further, the U-phase outer terminal portion U101 is electrically connected to a U-phase outer terminal portion U201 of the next U-phase coil portion U2 in the circumferential direction of FIG. 1.

In this example, it is the coil body 1 used in the three-phase rotating electrical machine. The U-phase coil portion U1 has 5 windings per phase.

The V-phase coil portion V1 (FIG. 9) is a coil body having a structure in which the V-phase outer coil portion and the V-phase inner coil portion in the radial direction of the cylindrical shape are insulated from each other and having a plurality of windings per phase. In FIG. 9, the front side of the drawing is the V-phase outer coil portion, and the rear side of the drawing is the V-phase inner coil portion.

The V-phase coil portion V1 is formed such that the V-phase outer coil portion of the cylindrical shape and the V-phase inner coil portion of the cylindrical shape, which are electrically connected to each other at a lower end side V105, are insulated from each other in the radial direction.

Specifically, the V-phase outer coil portion of the V-phase coil portion V1 extends in a form including a portion V103 extending from a V-phase outer terminal portion V101 on the upper end side of the cylindrical shape toward a lower end of the cylindrical shape in the axial direction of the cylindrical shape. The V-phase inner coil portion of the V-phase coil portion V1 is positioned inward of the V-phase outer coil portion in the radial direction, has a lower end side electrically connected to the lower end side of the V-phase outer coil portion, extends in a form including a portion extending toward the upper end of the cylindrical shape in the axial direction of the cylindrical shape, and terminates at a V-phase inner terminal portion V102 positioned inward of the V-phase outer terminal portion V101 in the radial direction on the upper end side of the cylindrical body.

In the V-phase coil portion V1, the V-phase inner terminal portion V102 is electrically connected to a V-phase inner terminal portion V202 of the next V-phase coil portion V2 in the circumferential direction of FIG. 1. Further, the V-phase outer terminal portion V101 is electrically connected to a V-phase outer terminal portion V201 of the next V-phase coil portion V2 in the circumferential direction of FIG. 1.

In this example, it is the coil body 1 used in the three-phase rotating electrical machine. The V-phase coil portion V1 has 5 windings per phase.

The W-phase coil portion W1 (FIG. 9) is a coil body having a structure in which the W-phase outer coil portion and the W-phase inner coil portion in the radial direction of the cylindrical shape are insulated from each other and having a plurality of windings per phase. In FIG. 9, the front side of the drawing is the W-phase outer coil portion, and the rear side of the drawing is the W-phase inner coil portion.

The W-phase coil portion W1 is formed such that the W-phase outer coil portion of the cylindrical shape and the W-phase inner coil portion of the cylindrical shape, which are electrically connected to each other at a lower end side W105, are insulated from each other in the radial direction.

Specifically, the W-phase outer coil portion of the W-phase coil portion W1 extends in a form including a portion W103 extending from a W-phase outer terminal portion W101 on the upper end side of the cylindrical shape toward a lower end of the cylindrical shape in the axial direction of the cylindrical shape. The W-phase inner coil portion of the W-phase coil portion W1 is positioned inward of the W-phase outer coil portion in the radial direction, has a lower end side electrically connected to the lower end side of the W-phase outer coil portion, extends in a form including a portion extending toward the upper end of the cylindrical shape in the axial direction of the cylindrical shape, and terminates at a W-phase inner terminal portion W102 positioned inward of the W-phase outer terminal portion W101 in the radial direction on the upper end side of the cylindrical body.

In the W-phase coil portion W1, the W-phase inner terminal portion W102 is electrically connected to a W-phase inner terminal portion W202 of the next W-phase coil portion W2 in the circumferential direction of FIG. 1. Further, the W-phase outer terminal portion W101 is electrically connected to a W-phase outer terminal portion W201 of the next W-phase coil portion W2 in the circumferential direction of FIG. 1.

In this example, it is the coil body 1 used in the three-phase rotating electrical machine. The W-phase coil portion W1 has 5 windings per phase.

In the coil body of this example, the U-phase inner terminal portion U102 on the upper end side of one U-phase coil portion U1 and the U-phase inner terminal portion U202 on the upper end side of the next U-phase coil portion U2 in the circumferential direction are electrically connected to each other by a conductive inner junction 501.

Similarly, the V-phase inner terminal portion V102 on the upper end side of one V-phase coil portion V1 and the V-phase inner terminal portion V202 on the upper end side of the next V-phase coil portion V2 in the circumferential direction are electrically connected to each other by a conductive inner junction 601.

In addition, the W-phase inner terminal portion W102 on the upper end side of one W-phase coil portion W1 and the W-phase inner terminal portion W202 on the upper end side of the next W-phase coil portion W2 in the circumferential direction are electrically connected to each other by a conductive inner junction.

Further, the U-phase outer terminal portion U101 on the upper end side of one U-phase coil portion U1 and the U-phase outer terminal portion U201 on the upper end side of the next U-phase coil portion U2 in the circumferential direction are electrically connected to each other by a conductive outer junction 500.

Similarly, the V-phase outer terminal portion V101 on the upper end side of one V-phase coil portion V1 and the V-phase outer terminal portion V201 on the upper end side of the next V-phase coil portion V2 in the circumferential direction are electrically connected to each other by a conductive outer junction 600.

In addition, the W-phase outer terminal portion W101 on the upper end side of one W-phase coil portion W1 and the W-phase outer terminal portion W201 on the upper end side of the next W-phase coil portion W2 in the circumferential direction are electrically connected to each other by a conductive outer junction.

In this manner, the one U-phase coil portion and the next U-phase coil portion in the circumferential direction, the one V-phase coil portion and the next V-phase coil portion in the circumferential direction, and the one W-phase coil portion and the next W-phase coil portion in the circumferential direction are electrically connected by conductive junctions, respectively.

Inner junctions 401, 501, and 601 all have the same structure and are made of a conductive metal, for example, copper. Outer junctions 400, 500, and 600 all have the same structure, and are made of a conductive metal, for example, copper.

Referring to FIGS. 4A to 7, the outer junctions 400, 500, and 600 are arranged on the outer circumferential side of the cylindrical coil body 1, and extend in the circumferential direction to form an arc shape in plan view as shown in FIGS. 4A to 4C and 5. Further, small-diameter arc portions 402, 502, and 602 having a small radius of curvature and large-diameter arc portions 403, 503, and 603 having a large radius of curvature are continuous via step portions 410, 510, and 610 which are formed in the intermediate portions in the circumferential direction and have a stair shape in plan view. Furthermore, concave portions 406, 407, 506, 507, 606, and 607 are provided on the upper side of both ends extending in an arc shape when being disposed on the outer circumferential side of the cylindrical coil body 1.

The U-phase outer terminal portions, the V-phase outer terminal portions, and the W-phase outer terminal portions which are sequentially arranged in the circumferential direction, are electrically connected to each other, respectively, by the U-phase outer terminal portions on the upper end side, the V-phase outer terminal portions on the upper end side, or the W-phase outer terminal portions on the upper end side of the cylindrical coil body 1 being bent to be inserted to the concave portions 406, 407, 506, 507, 606, and 607.

The radially inner surface and the radially outer surface of each of the outer junctions 400, 500, and 600 have electrical insulation. For example, an insulating coating film is formed on the radially inner surface and the radially outer surface of each of the copper outer junctions 400, 500, and 600.

The inner junctions 401, 501, and 601 are arranged on the inner circumferential side of the cylindrical coil body 1, and extend in the circumferential direction to form an arc shape in plan view as shown in FIGS. 4A to 4C and 6. Further, small-diameter arc portions 404, 504, and 604 having a small radius of curvature and large-diameter arc portions 405, 505, and 605 having a large radius of curvature are continuous via step portions 410, 510, and 610 which are formed in the intermediate portions in the circumferential direction and have a stair shape in plan view. Furthermore, concave portions 408, 409, 508, 509, 608, and 609 are provided on the upper side of both ends extending in an arc shape when being disposed on the outer circumferential side of the cylindrical coil body 1.

The U-phase inner terminal portions, the V-phase inner terminal portions, and the W-phase inner terminal portions which are sequentially arranged in the circumferential direction, are electrically connected to each other, respectively, by the U-phase inner terminal portions on the upper end side, the V-phase inner terminal portions on the upper end side, or the W-phase inner terminal portions on the upper end side of the cylindrical coil body 1 being bent to be inserted to the concave portions 408, 409, 508, 509, 608, and 609.

The radially inner surface and the radially outer surface of each of the inner junctions 401, 501, and 601 have electrical insulation. For example, an insulating coating film is formed on the radially inner surface and the radially outer surface of each of the copper inner junctions 401, 501, and 601.

In FIG. 7, the outer junctions 400, 500, and 600 are arranged on the radially outer side, and the inner junctions 401, 501, and 601 are arranged on the radially inner side. Although not shown in FIG. 7, the coil body is sandwiched between the outer junctions and the inner junctions. That is, the U-phase inner terminal portion and the U-phase outer terminal portion on the upper end side of the U-phase coil portion consisting of the U-phase inner coil portion and the U-phase outer coil portion, the V-phase inner terminal portion and the V-phase outer terminal portion on the upper end side of the V-phase coil portion consisting of the V-phase inner coil portion and the V-phase outer coil portion, the W-phase inner terminal portion and the W-phase outer terminal portion on the upper end side of the W-phase coil portion consisting of the W-phase inner coil portion and the W-phase outer coil portion are sandwiched between the outer junctions and the inner junctions.

Therefore, when arranged in the circumferential direction of the cylindrical coil body 1 as shown in FIG. 1, the diameter of a circle formed by the large-diameter arc portions 403, 503, 603, and the like of the outer junctions 400, 500, 600, and the like is larger than the diameter of a circle formed by the large-diameter arc portions 405, 505, 605, and the like of the inner junctions 401, 501, 601, and the like.

Similarly, when arranged in the circumferential direction of the cylindrical coil body 1 as shown in FIG. 1, the diameter of a circle formed by the small-diameter arc portions 402, 502, 602, and the like of the outer junctions 400, 500, 600, and the like is larger than the diameter of a circle formed by the small-diameter arc portions 404, 504, 604, and the like of the inner junctions 401, 501, 601, and the like.

Since each of the outer junctions 400, 500, and 600 has the above-described structure, the outer junctions 400, 500, and 600 can be arranged on the outer circumference of the cylindrical coil body 1 so as to be shifted from each other in the circumferential direction of the coil body 1 as shown in FIG. 5. That is, the radially inner side of the large-diameter arc portion 403 of the outer junction 400, which is at the leading position of the outer junction 500 in the circumferential direction, abuts on the radially outer side of the small-diameter arc portion 502 of the outer junction 500. The radially outer side of the small-diameter arc portion 602 of the outer junction 600, which is at the following position of the outer junction 500 in the circumferential direction, abuts on the radially inner side of the large-diameter arc portion 503 of the outer junction 500.

Since each of the outer junctions 400, 500, and 600 has the above-described structure, it is possible to suppress an increase in thickness of the coil body 1 in the radial direction when the outer junctions 400, 500, and 600 are arranged on the outer circumference of the cylindrical coil body 1 as shown in FIG. 5.

When the outer junctions 400, 500, and 600 are mounted on the outer circumference of the coil body 1 as shown in FIGS. 5 and 1, the outer junctions 400, 500, and 600 can be mounted on the outer circumference of the coil body 1 by using a junction support portion (outer support portion) 3 made of synthetic resin as shown in FIG. 8B.

The U-phase outer terminal portion U101 on the upper end side of one U-phase coil portion U1 is bent to be connected to the concave portion 506 of the outer junction 500. On the other hand, the U-phase outer terminal portion U201 on the upper end side of the U-phase coil portion U2, which is at the following position in the circumferential direction, is bent to be connected to the concave portion 507 of the outer junction 500. In this manner, the U-phase outer terminal portion U101 on the upper end side of one U-phase coil portion U1 and the U-phase outer terminal portion U201 on the upper end side of the next U-phase coil portion U2 in the circumferential direction are electrically connected to each other by the conductive outer junction 500.

The V-phase outer terminal portion V101 on the upper end side of one V-phase coil portion V1 is bent to be connected to the concave portion 606 of the outer junction 600. On the other hand, the V-phase outer terminal portion V201 on the upper end side of the V-phase coil portion V2, which is at the following position in the circumferential direction, is bent to be connected to the concave portion 607 of the outer junction 600. In this manner, the V-phase outer terminal portion V101 on the upper end side of one V-phase coil portion V1 and the V-phase outer terminal portion V201 on the upper end side of the next V-phase coil portion V2 in the circumferential direction are electrically connected to each other by the conductive outer junction 600.

The W-phase outer terminal portion on the upper end side of one W-phase coil portion is bent to be connected to the concave portion 407 of the outer junction 400. On the other hand, the W-phase outer terminal portion on the upper end side of the next W-phase coil portion in the circumferential direction is bent to be connected to the concave portion 406 of the outer junction 400. In this manner, the W-phase outer terminal portion on the upper end side of one W-phase coil portion and the W-phase outer terminal portion on the upper end side of the next W-phase coil portion in the circumferential direction are electrically connected to each other by the conductive outer junction 400.

Since each of the inner junctions 401, 501, and 601 has the above-described structure, the inner junctions 401, 501, and 601 can be arranged on the inner circumference of the cylindrical coil body 1 so as to be shifted from each other in the circumferential direction of the coil body 1 as shown in FIG. 6. That is, the radially inner side of the large-diameter arc portion 405 of the inner junction 401, which is at the leading position of the inner junction 501 in the circumferential direction, abuts on the radially outer side of the small-diameter arc portion 504 of the inner junction 501. The radially outer side of the small-diameter arc portion 604 of the inner junction 601, which is at the following position of the outer junction 500 in the circumferential direction, abuts on the radially inner side of the large-diameter arc portion 505 of the inner junction 501.

Since each of the inner junctions 401, 501, and 601 has the above-described structure, it is possible to suppress an increase in thickness of the coil body 1 in the radial direction when the inner junctions 401, 501, and 601 are arranged as shown in FIG. 6.

When the inner junctions 401, 501, and 601 are mounted on the inner circumference of the coil body 1 as shown in FIGS. 6 and 1, the inner junctions 401, 501, and 601 can be mounted on the inner circumference of the coil body 1 by using a junction support portion (inner support portion) 2 made of synthetic resin as shown in FIG. 8A.

The U-phase inner terminal portion U102 on the upper end side of one U-phase coil portion U1 is bent to be connected to the concave portion 508 of the inner junction 501. The U-phase inner terminal portion U202 on the upper end side of the next U-phase coil portion U2 is bent to be connected to the concave portion 509 of the inner junction 501. In this manner, the U-phase inner terminal portion U102 on the upper end side of one U-phase coil portion U1 and the U-phase inner terminal portion U202 on the upper end side of the next U-phase coil portion U2 in the circumferential direction are electrically connected to each other by the conductive inner junction 501.

The V-phase inner terminal portion V102 on the upper end side of one V-phase coil portion V1 is bent to be connected to the concave portion 608 of the inner junction 601. The V-phase inner terminal portion V202 on the upper end side of the next V-phase coil portion V2 is bent to be connected to the concave portion 609 of the inner junction 601. In this manner, the V-phase inner terminal portion V102 on the upper end side of one V-phase coil portion V1 and the V-phase inner terminal portion V202 on the upper end side of the next V-phase coil portion V2 in the circumferential direction are electrically connected to each other by the conductive inner junction 601.

The W-phase inner terminal portion on the upper end side of one W-phase coil portion is bent to be connected to the concave portion 409 of the inner junction 401. On the other hand, the W-phase inner terminal portion on the upper end side of the next W-phase coil portion in the circumferential direction is bent to be connected to the concave portion 408 of the inner junction 401. In this manner, the W-phase inner terminal portion on the upper end side of one W-phase coil portion and the W-phase inner terminal portion on the upper end side of the next W-phase coil portion in the circumferential direction are electrically connected to each other by the conductive inner junction 401.

With the coil body of this embodiment for a coreless rotating electrical machine having a cylindrical shape in which a plurality of sets each having the U-phase coil portion constituting the U-phase, the V-phase coil portion constituting the V-phase, and the W-phase coil portion constituting the W-phase are sequentially arranged in the circumferential direction so as to form an annular cylindrical body in plan view, the one U-phase coil portion and the next U-phase coil portion in the circumferential direction, the one V-phase coil portion and the next V-phase coil portion in the circumferential direction, and the one W-phase coil portion and the next W-phase coil portion in the circumferential direction are electrically connected by conductive junctions, respectively.

By using a highly conductive member such as copper as the conductive junction, it is possible to cause a large current to pass.

Further, by adopting the inner junction 401 and the like and the outer junction 400 and the like having the above-described structure, it is possible to suppress an increase in size in the radial direction, and to provide a coil body that is space-saving and miniaturized.

Although the embodiments and examples of the invention have been described above, the invention is not limited to the above-described embodiments and examples, and can be variously modified within the technical scope grasped from the description of the claims.

What is claimed is:

1. A cylindrical coil body for a coreless rotating electrical machine having a cylindrical shape in which a plurality of sets each having a U-phase coil portion constituting a U-phase, a V-phase coil portion constituting a V-phase, and a W-phase coil portion constituting a W-phase are sequentially arranged in a circumferential direction to form an annular cylindrical body in plan view, wherein one of the U-phase coil portions and a next of the U-phase coil portions in the circumferential direction, one of the V-phase coil portions and a next of the V-phase coil portions in the circumferential direction, and one of the W-phase coil portions and a next W-phase coil portions in the circumferential direction are electrically connected by conductive junctions, respectively, wherein the junctions are disposed on a circumferential surface of the cylindrical coil body, and extend in the circumferential direction to form an arc shape in plan view, in the junctions, a small-diameter arc portion having a small radius of curvature and a large-diameter arc portion having a large radius of curvature are continuous to each other via a step portion which is formed in an intermediate portion in the circumferential direction and has a stair shape in plan view, in the junctions, a radially inner surface and a radially outer surface have electrical insulation, and in the junctions, concave portions where electrical connection is performed by a terminal portion of the U-phase coil portion, a terminal portion of the V-phase coil portion, or a terminal portion of the W-phase coil portion being bent to be inserted to the concave portion are provided on an upper side of both ends extending in the arc shape when being disposed on the circumferential surface of the cylindrical coil body.

2. The cylindrical coil body according to claim 1, wherein each of said junction is a flat plate when viewed from the radial direction, the junctions are arranged on the circumference of the cylindrical coil body, wherein the radially inner side of the large-diameter arc portion of the first junction, which is at the leading position of the second junction in the circumferential direction, abuts on the radially outer side of the small-diameter arc portion of the second junction, and the radially outer side of the small-diameter arc portion of the third junction, which is at a following position of the second junction in the circumferential direction, abuts on the radially inner side of the large-diameter arc portion of the second junction, thereby the junctions are arranged on the circumference of the cylindrical coil body so as to be shifted from each other in the circumferential direction of the coil body, and an increase in thickness of the coil body in the radial direction is suppressed.

* * * * *